US011998906B2

(12) United States Patent
Kneucker et al.

(10) Patent No.: US 11,998,906 B2
(45) Date of Patent: Jun. 4, 2024

(54) PIPETTE AND METHOD OF OPERATING A PIPETTE

(71) Applicant: BRAND GMBH + CO KG, Wertheim (DE)

(72) Inventors: Ottmar Kneucker, Helmstadt (DE); Peter Krank, Wertheim (DE); Nina Lang, Würzburg (DE)

(73) Assignee: BRAND GMBH + CO KG, Wertheim (DE)

( * ) Notice: Subject to any disclaimer, the term of this patent is extended or adjusted under 35 U.S.C. 154(b) by 546 days.

(21) Appl. No.: 17/316,771

(22) Filed: May 11, 2021

(65) Prior Publication Data

US 2021/0346883 A1 Nov. 11, 2021

(30) Foreign Application Priority Data

May 11, 2020 (DE) ..................... 10 2020 002 781.4

(51) Int. Cl.
*B01L 3/02* (2006.01)

(52) U.S. Cl.
CPC ........... *B01L 3/0227* (2013.01); *B01L 3/0237* (2013.01); *B01L 2300/027* (2013.01)

(58) Field of Classification Search
USPC ....................................................... 73/864.18
See application file for complete search history.

(56) References Cited

U.S. PATENT DOCUMENTS 3,809,297 A * 5/1974 Poulten ................... F04B 49/12 73/864.18
4,905,526 A * 3/1990 Magnussen, Jr. ..... B01L 3/0227 73/864.18
5,187,990 A * 2/1993 Magnussen, Jr. ..... B01L 3/0227 73/864.18
5,531,131 A 7/1996 Sabloewski
9,630,174 B2 * 4/2017 Sarna .................... B01L 3/0224
10,913,059 B2 * 2/2021 Schiraga ................. F16H 37/04
2005/0039550 A1 2/2005 Uldry et al.
2023/0001403 A1 * 1/2023 Kneucker ............. B01L 3/0237

OTHER PUBLICATIONS

Anonymous, "Brand—Liquid Handling, Transferpette® Pipetting System", General Catalog 900 (Laboratory Instruments by Brand), Brand Gmbh + Co KG, Oct. 2019, pp. 46 to 52, Germany.

* cited by examiner

*Primary Examiner* — Clayton E. LaBalle
*Assistant Examiner* — Warren K Fenwick
(74) *Attorney, Agent, or Firm* — Calderon Safran & Wright, P.C.; David S. Safran

(57) ABSTRACT

A pipette (1) having a cylinder (10), a piston (8), a volume display (25) for displaying a pipetting volume (14) associated with the piston stroke, a display adjustment mechanism (22) for changing the volume display (25), an adjustment display for indicating an adjustment of the pipette (1) via the volume display (25), and a volume adjustment mechanism (19) for changing the piston stroke, the volume adjustment mechanism (19) being coupled to the display adjustment mechanism (22) in a first mode of operation of the pipette (1), and the volume adjustment mechanism (19) being decoupled from the display adjustment mechanism (22), and the display adjustment mechanism (22) being coupled to the adjustment display in a second mode of operation of the pipette (1), a method of operating such a pipette.

19 Claims, 16 Drawing Sheets

Z 2:1

X 2:1

Y 2:1

Zj 2 : 1

Yj 2 : 1

Xj 2 : 1

Zj 2:1

Yj 2:1

Xj 2:1

Z 2 : 1

X 2:1

Zj 2 : 1

Xj 2:1

Z 2 : 1

X 2:1

PIPETTE AND METHOD OF OPERATING A PIPETTE

BACKGROUND OF THE INVENTION

Field of the Invention

The invention relates to a pipette, and to a method of operating a pipette.

Description of the Related Art

Pipettes, such as microliter pipettes, are used for precise dispensing of liquid volumes, for example in the milli- and microliter range. For example, such pipettes are designed as piston-stroke pipettes. European Patent Application Publication EP 0 649 678 A1 and corresponding U.S. Pat. No. 5,531,131 disclose a piston-stroke pipette of this type. This pipette has a manual actuating device for changing a pipetting volume by means of a displacement device. With the variable pipetting volume, liquid is taken up and dispensed by the pipette. The actuation stroke of this pipette can be adjusted for precise liquid aspiration.

The change in pipetting volume is indicated to the user on piston-stroke pipettes by means of a volume display. A more precise possibility of adjusting piston-stroke pipettes is provided by this volume display compared to the actuating stroke. Such a pipette is known from European Patent Application Publication EP 1 514 600 A1, and corresponding U.S. Patent Application Publication 2005/0039550 A1, and represents the "Transferpette S" (General Catalog 900 "Laboratory Instruments by Brand" 10/19, pages 46 to 52). With these pipettes, the user can use the adjustment of the volume display with the pipette to set actually aspirated and individually used liquid. Adjustment to the original setting requires exact volume determination according to the relevant standard.

SUMMARY OF THE INVENTION

One task underlying the invention is to provide a pipette which enables a user to adjust the pipette in a particularly simple and reliable manner.

According to one aspect, a pipette is disclosed. The pipette comprises a cylinder and a piston which is axially displaceably arranged in the cylinder. An axial movement of the piston is limited by an upper stop and a lower stop so that a piston stroke is defined. The pipette has a volume display for displaying a pipetting volume associated with the piston stroke. The pipette has a display adjustment mechanism for changing the volume display. The pipette has an adjustment display for indicating an adjustment of the pipette via the volume display. The pipette has a volume adjustment mechanism for changing the piston stroke. In a first mode of operation of the pipette, the volume adjustment mechanism is coupled to the display adjustment mechanism. In a second mode of operation of the pipette, the volume adjustment mechanism is decoupled from the display adjustment mechanism, and the display adjustment mechanism is coupled to the adjustment display.

The pipette described is, for example, a microliter pipette that can have subsequent components in a housing or individually in several connectable housing parts: The piston stroke of the microliter pipette, limited by the upper stop and/or the lower stop, is changed mechanically usually by a screw or rotary movement on elements connected to the respective stop. The volume display and/or the adjustment display have counters, for example. Microliter pipettes are designed as piston stroke pipettes and are also called air cushion pipettes. The pipette functions according to the displacement principle: inside the pipette is the movable piston which, when actuated, for example when pressed down, displaces a column of air lying below it, the pipetting volume, or pulls it upwards with it in the upward movement. During this process, the liquid to be pipetted is sucked into a pipette tip that is attached to the cylinder, for example plugged on and/or made of plastic, and is pressed out of it again when the fluid is dispensed.

As there is an air cushion between the piston and the liquid to be pipetted in this type of pipette, the liquid medium usually only comes into contact with the pipette tip. External factors such as temperature, vapor pressure or density of the liquid to be pipetted can influence the air cushion and thus also the pipetting volume. Therefore, individual readjustment of the pipette may be necessary for certain dispensing operations and when dispensing liquids with different densities.

In the pipette described, two operating modes are provided between which the pipette is adjustable, in particular mechanically adjustable.

In the first operating mode, which may also be referred to as the working mode, the volume adjustment mechanism is coupled to the display adjustment mechanism so that when the volume adjustment mechanism is operated to change the piston stroke, the volume display is simultaneously changed by means of the display adjustment mechanism. In the first mode of operation, the display setting mechanism and the adjustment display are decoupled from each other. Also, the volume adjustment mechanism is not coupled to the adjustment display. This means that adjusting the piston stroke has no effect on the adjustment display.

In the second mode of operation, which may also be referred to as the adjustment mode, the volume adjustment mechanism is decoupled from the display adjustment mechanism and the display adjustment mechanism is coupled to the adjustment display, so that when the display adjustment mechanism is actuated, there is no adjustment of the piston stroke, but simultaneous adjustment of the volume display and the adjustment display. In other words, when the pipette is adjusted in the second mode of operation, the volume display is changed and the value of the adjustment is displayed at the same time, so that the volume display is adjusted and visible to an actual volume to be pipetted.

The pipette described enables simple user calibration of the pipette by adjusting the volume display. In doing so, the volume display is brought into agreement with the actually dispensed pipetting volume. The actual value of the pipetting volume is typically determined gravimetrically. The adjustment display shows the adjustment relative to the factory setting/calibration. The adjustment of the pipette with the adjustment of the display device for calibration can be traced in retrospect and the factory calibration of the pipette can be easily found again. Factory calibration is the term used to describe the calibration performed by the manufacturer, for example, after production, under precisely defined conditions. Water of standardized quality is typically used as the test liquid. The requirements for the climate correspond to standardized conditions.

Another advantage of the pipette is that there is no need for "trial & error" adjustment. It is not necessary to measure deviations between a defined target value and a typically gravimetrically determined actual value of the pipetting volume or to readjust the pipette (usually several times). In this case, calculation formulas and conversion tables would typically be used to determine the piston stroke change required for the adjustment. As a rule, the upper end point (upper stop) and/or the lower end point (lower stop) of the piston stroke would be changed by a screw or rotary movement on the elements connected to the respective stop.

The volume display and/or the adjustment display have, for example, counters with one or more counting wheels, in particular counting gears.

The volume adjustment mechanism is designed to mechanically change the upper and/or lower stop for the piston. This sets a piston travel, i.e., a maximum axial displacement length of the piston, and thus the piston stroke volume. The display setting mechanism is designed analogously to the volume setting mechanism to actuate the volume display, that is, for example, to set the counter of the volume display. Alternatively, it is conceivable that the display setting mechanism also actuates the adjustment display depending on the operating mode of the pipette. For the adjustment display, for example, a corresponding adjustment mechanism is provided analogously. Many mechanical designs are conceivable for the aforementioned volume setting mechanism, display setting mechanism and/or adjustment mechanism, whereby these are designed in the most general form as simple (mechanical) couplings for actuating or changing the corresponding display or piston stroke. For example, said mechanisms have one or more sleeves, gears, gear wheels, coupling devices and/or other components.

The pipette described is a single-channel pipette or single-channel microliter pipette with a piston/cylinder unit. Optionally, the pipette has several piston/cylinder units, to each of which separate pipette tips can be attached. Such a pipette is a multichannel pipette or multichannel microliter pipette.

The couplings described are, for example, mechanical couplings, such as positive or frictional couplings. The couplings include indirect or direct couplings. The couplings include, for example, coupling devices. The couplings may be geared or reduced. The couplings may be variously configured and include, for example, one or more gears, gearing, drivers, and/or other components.

According to one embodiment, the described pipette advantageously has an ejection mechanism which allows the user to remove the pipette tip from the lower end of the pipette without touching it. For example, the ejection of the pipette tip can be performed via an axial displacement of the housing, whereby the pipette tip is ejected.

According to one embodiment, the pipette described advantageously has a locking mechanism which is intended to prevent accidental volume adjustment. This is to ensure that the volume is not inadvertently adjusted during the pipetting process.

According to at least one embodiment, the volume adjustment mechanism only changes the upper stop for the piston. Thus, the lower stop is not adjusted. This increases the precision during calibration.

According to at least one embodiment, the pipette has an operating device that is adjustable between the first operating mode and the second operating mode. In the first operating mode, the operating device is coupled to the volume adjustment mechanism for changing the piston stroke and to the volume display. In the second mode of operation, the control device is decoupled from the volume adjustment mechanism, but is coupled to the adjustment display and to the display adjustment mechanism, respectively.

In the first operating mode of the pipette, the operating device can be used to change the piston stroke and simultaneously adjust the volume display. In the second operating mode, the operating device can be used to adjust the volume display and the adjustment display. The embodiment enables settings to be made in both the first and second operating modes by means of one and the same operating device. For the different operating modes of the pipette, the operating device can be adjusted, for example, between two positions, such as a working position and an adjustment position. For example, the operating device can be adjusted axially with respect to a piston stroke rod between the two positions.

The operating device is designed, for example, in one or more parts and can have one or more coupling elements. For the actuation or adjustment of the mechanisms or the displays, the operating device can be rotated, in particular about a piston rod of the pipette connected to the piston. For example, the operating device comprises an operating element which can be manually operated, for example rotated, by a user of the pipette. For example, it is a rotatable adjustment wheel, adjustment knob or adjustment sleeve. Such an adjustment wheel, adjustment knob or adjustment sleeve has, for example, a knurled surface.

According to at least one embodiment, the operating device is positively coupled to the volume setting mechanism and the display setting mechanism in the first operating mode, and wherein the operating device is positively coupled to the display setting mechanism and the adjustment display in the second operating mode. As a result, the operating device is directly mechanically coupled to the adjustment indicator and directly mechanically coupled to the display adjustment mechanism in the second mode of operation. In other words, the operating device for operating the volume setting mechanism, the display setting mechanism, and the adjustment display (or a corresponding adjustment mechanism) each forms separate, direct mechanical couplings or coupling paths. A direct coupling is understood to mean one or more elements, such as a gearbox, etc. By means of the operating device, a corresponding actuating force can be transmitted for each coupling. In other words, the operating device forms two force transmission paths, one for actuating the volume display and one for actuating the adjustment display. This design contributes to a particularly direct and low-wear actuation of the displays.

According to at least one embodiment, the control device is positively coupled to the volume adjustment mechanism and the display adjustment mechanism, respectively, in the first mode of operation, wherein the control device is positively coupled to the display adjustment mechanism in the second mode of operation. In the second mode of operation, the adjustment indicator is coupled to the display adjustment mechanism such that an actuation of the display adjustment mechanism simultaneously causes an actuation of the adjustment indicator. According to this embodiment, the operating device is indirectly coupled to the adjustment display in the second operating mode. This means that by means of the operating device in the second operating mode, only an actuating force can be transmitted to the display setting mechanism, and the display setting mechanism converts this actuating force to actuate the adjustment display. Thus, in contrast to the above embodiment, the operating device does not form a respective force transmission path for actuating the adjustment or volume display. This embodiment allows a particularly compact design, since a force transmission path with one or more coupling elements is dispensed with.

According to at least one embodiment, the operating device has an adjustment sleeve that is positively coupled to the volume adjustment mechanism and the display adjustment mechanism, respectively, in the first operating mode. In the second mode of operation, the adjustment sleeve is positively coupled to the display setting mechanism and positively coupled to the adjustment display, respectively. This contributes to the advantages and functions mentioned above. Advantageously, the adjustment sleeve provides a central actuating element for the operating modes of the pipette. For example, the adjustment sleeve is directly accessible and operable by a user. In other embodiments, the adjustment sleeve is fixedly connected to an operating element as described above for actuation by a user.

According to at least one embodiment, the adjustment sleeve comprises a first coupling element for actuating the display adjustment mechanism and a second coupling element for actuating the adjustment indicator. A coupling element is, for example, a toothing, a gear, a driver, a groove or a projection, which is or comes into engagement with a corresponding counter-coupling element of the display setting mechanism or the adjustment indicator (or the adjustment mechanism, respectively).

According to at least one embodiment, the adjustment sleeve for adjustment between the first and second operating modes is mounted axially displaceably in a housing of the pipette. The displaceability is limited, for example, by stops. In the respective operating modes, the adjustment sleeve and/or an operating element connected to the adjustment sleeve is latched to a housing or another fixed element of the pipette, whereby the rotatability is given and only the displacement movement is inhibited or blocked. This enables a space-saving design and simple, user-friendly operation. Optionally, the pipette and/or the operating device advantageously have a locking device for adjusting the adjustment sleeve in order to keep the adjustment sleeve stable and rotatable.

According to at least one embodiment, the adjustment sleeve is arranged coaxially with a piston stroke rod. The adjustment sleeve is thus arranged around the piston stroke rod in a space-saving manner and is displaceable. Alternatively, the adjustment sleeve is guided laterally past the device in the form of a shaft, whereby it is arranged offset parallel to the piston stroke rod.

According to at least one embodiment, the volume display and the adjustment display are each designed as a counter with one or more rotatably mounted counting wheels. Several counting wheels are advantageously designed as counting gears and connected via driving gears. The counting wheels are conveniently arranged on a common axis of rotation, which is mounted, for example, fixed to the housing. This enables a space-saving and compact design.

According to at least one embodiment, the volume display and the adjustment display are designed as one assembly or as two assemblies. The design as one assembly, for example, by means of a common rotation axis for the counter wheels as described above, contributes to an easier assembly of the pipette. The design as two assemblies allows the displays to be placed at different locations on the pipette, thus increasing flexibility.

According to at least one embodiment, the volume display and/or the adjustment display are arranged in a finger grip of the pipette or in an operating element for actuating the volume adjustment mechanism. This contributes to increased user-friendliness.

According to at least one embodiment, the volume display and/or the adjustment display are arranged offset to or coaxially around a piston stroke rod. For example, separate axes of rotation of the counters of the two displays or a common axis of rotation of the counters of both displays are arranged offset parallel to the piston stroke rod. Alternatively, the one or more counting wheels of one or both displays are arranged around the piston stroke rod. This enables better readability of the displays for a user, in particular the counting wheels can have larger numbers.

According to at least one embodiment, the display setting mechanism has a gear. In an advantageous manner, a planetary gear is provided. A reduction gear can be set up, for example, to allow the counter wheels of the volume display to rotate more slowly with respect to their drive. This is actuated, for example, by the operating device, in particular the adjustment sleeve. The planetary gear is arranged around the piston stroke rod, for example, and enables precise actuation of the volume display.

According to at least one embodiment, the display setting mechanism and the adjustment display are connected via a common gear device or have a common gear device. The gear device is, for example, a coupling device.

According to at least one embodiment, in a third operating mode of the pipette, the volume adjustment mechanism is decoupled from the display adjustment mechanism, and the display adjustment mechanism is decoupled from the adjustment display. The third mode of operation may also be referred to as the factory adjustment mode and is used, for example, only when serviced by the manufacturer. In the third mode, the display adjustment mechanism is adjustable with the volume display alone, with no effect on the adjustment display and the volume adjustment mechanism or piston volume. A display of the adjustment is not necessary and not wanted in the factory calibration.

The third operating mode is preferably set by the operating device, in particular the setting sleeve. The operating device is adjusted between the first, second and third operating modes. It is axially displaceable in the pipette and can be axially displaced in one direction from the first to the third operating mode, which enables a space-saving and compact design.

Alternatively, the operating device is in a central position in the first operating mode and is axially displaced in a first direction for adjustment to the second mode and in a second direction opposite to the first direction for adjustment to the third mode.

The third operating mode is alternatively set by a second operating device, the second operating device being designed, for example, in accordance with the above embodiments.

The above embodiments and explanations apply essentially analogously. In particular, for example, the operating device can be moved to a corresponding factory adjustment position, in which only the volume display can then be actuated. For example, the operating device, such as the aforementioned adjustment sleeve, is moved axially into the factory adjustment position so that the volume display can be adjusted. Thus, for example, the pipette can be operated in three modes by means of one and the same operating device.

According to a further aspect, a method for operating a pipette, in particular a pipette according to one of the described embodiments, is disclosed. The method comprises the following steps:

operating a display adjustment mechanism of the pipette in a second operating mode of the pipette, wherein a volume display and an adjustment display for indicating an adjustment of the pipette are changed, and wherein a piston stroke of the pipette is maintained in the second operating mode, operating a volume adjustment mechanism of the pipette and the display adjustment mechanism in a first operating mode of the pipette, and thereby setting a piston stroke of the pipette, and actuating a volume display.

The method substantially enables the aforementioned advantages and functions. In the second mode of operation, the volume display and the adjustment display are simultaneously adjustable as described above, but the volume adjustment mechanism is not actuated.

According to further embodiments, the method has one or more further steps that correspond to the above-mentioned embodiments and further embodiments of the pipette analogously—if possible. For example, the mechanisms or displays are actuated by means of the above-mentioned operating device. The operating device, for example, the adjustment sleeve and an operating element coupled thereto, is adjusted, for example, between two corresponding positions as described above in order to be actuated in the respective operating mode of the pipette. Also, the method comprises, for example, a third operating mode as explained above.

It should be mentioned that the sequence of steps is arbitrary. In addition, one or more steps can optionally be performed repeatedly.

Further advantages, features and embodiments will be apparent from the following examples of embodiments of the invention explained in connection with the figures of the drawings. Elements which are identical, similar or have the same effect are provided with the same reference signs in the figures. For reasons of clarity, not all of the elements shown in all of the figures are marked with the corresponding reference signs, where applicable.

DETAILED DESCRIPTION OF THE INVENTION

Figure 1:
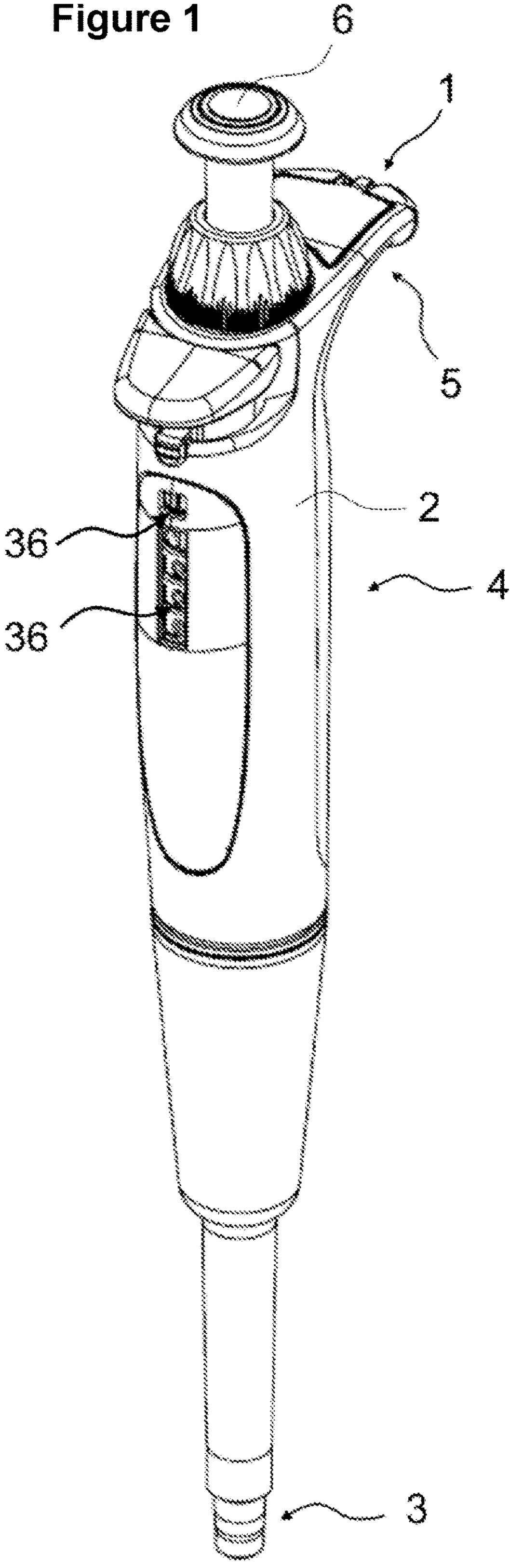
FIG. 1 is a perspective view of a pipette according to a first embodiment of the invention.

FIG. 1 shows a perspective view of a pipette 1 according to a first embodiment of the invention. The pipette 1 is designed as a piston stroke pipette. The pipette 1 has a pipette housing 2 and a pipette tip is arranged at the lower end 3, which is not shown in the figures. The pipette tip is, for example, plugged on and is made of plastic. The pipette 1 has a grip portion 4 and a finger clip 5, so that the pipette 1 can be easily gripped and held. The pipette 1 has a pipetting button 6 provided at the upper end of the pipette 1.

Figure 2:
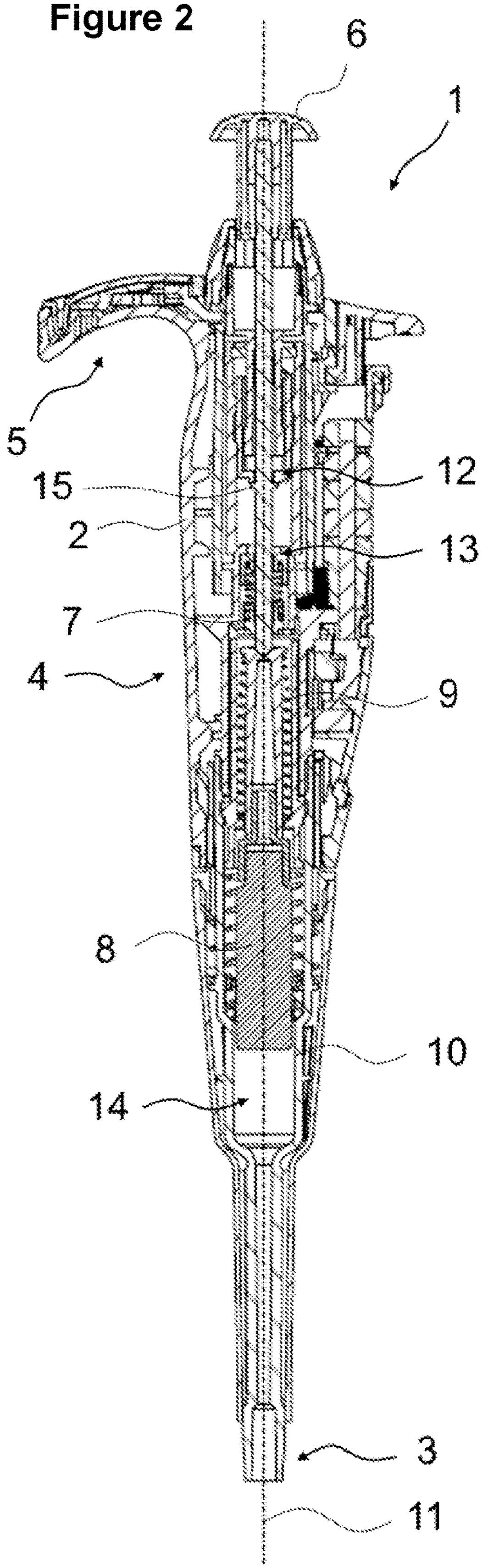
FIG. 2 is a sectional view of the pipette according to the first embodiment.

Looking at the sectional view of FIG. 2, it can be seen that the pipetting button 6 is firmly connected to a piston rod 7. A piston 8 is arranged at a lower end of the piston stroke rod 7, which is axially displaceable with respect to a longitudinal axis 11 of the pipette 1 against a spring force of a spring 9 in a cylinder 10. The longitudinal axis 11 coincides with a central longitudinal axis of the piston stroke rod 7. The axial displaceability of the piston 8 is limited by an upper stop 12 and a lower stop 13, against which a flange 15 of the piston stroke rod 7 abuts, so that a maximum piston stroke and thus a corresponding pipetting volume 14 are defined.

When the piston 8 is pushed into the cylinder 10 by means of the pipetting button 6, approximately until the flange 15 abuts the lower stop 13, air is displaced from the cylinder 10 and the pipette tip fluidically connected to the cylinder 10 at the lower end 3. Without actuation, the piston 8 and thus the pipetting button 6 are forced back to the original position as shown in the figures due to the spring force of the spring 9. In this process, the pipette tip can receive fluid.

The pipette 1 has two operating modes and adjustment options, which are explained with reference to FIGS. 3 to 8.

The pipette 1 has an operating device 16 which, in the embodiment example, has an operating element 17 and a multi-part adjustment sleeve 18 which is firmly connected to the operating element 17. The operating device 16, i.e., the operating element 17 and the adjusting sleeve 18, is cylindrical in shape and is arranged around the piston stroke rod 7. The operating device 16 is rotatable and axially displaceable with respect to the longitudinal axis 11.

The pipette 1 has a volume adjustment mechanism 19 by means of which the maximum piston stroke can be adjusted. In the example, as in the piston-stroke pipette of EP 0 649 678 A1 and corresponding U.S. Pat. No. 5,531,131 mentioned in the Background, the volume adjustment mechanism 19 is designed to change the upper stop 12 axially with respect to the longitudinal axis 11 via one or more components such as sleeves, threads and/or toothing. This allows the piston stroke and the pipetting volume to be variably adjusted.

Figure 3:
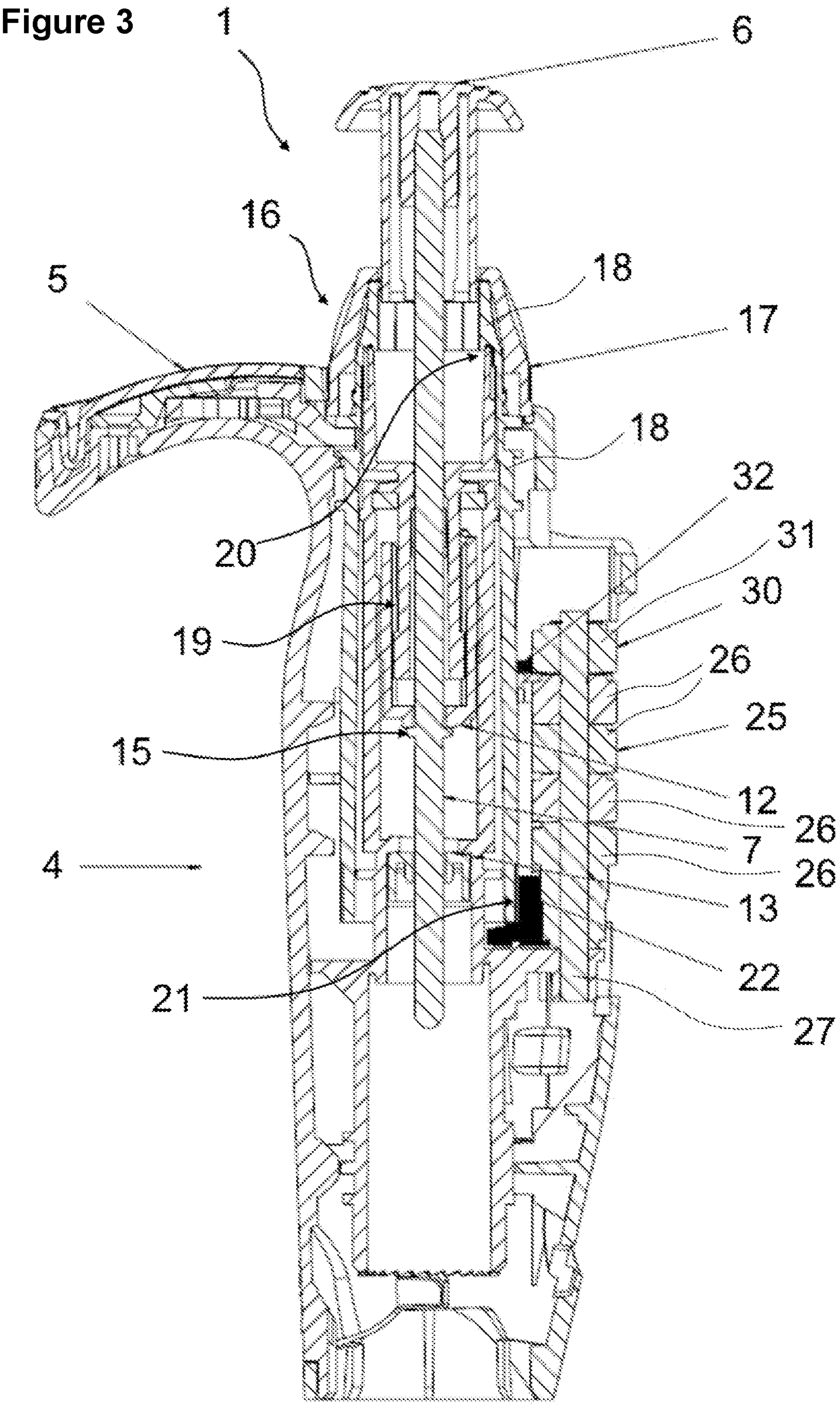
FIG. 3 is an enlarged sectional view of the pipette according to the first embodiment in a first operating mode.
Figure 4A:
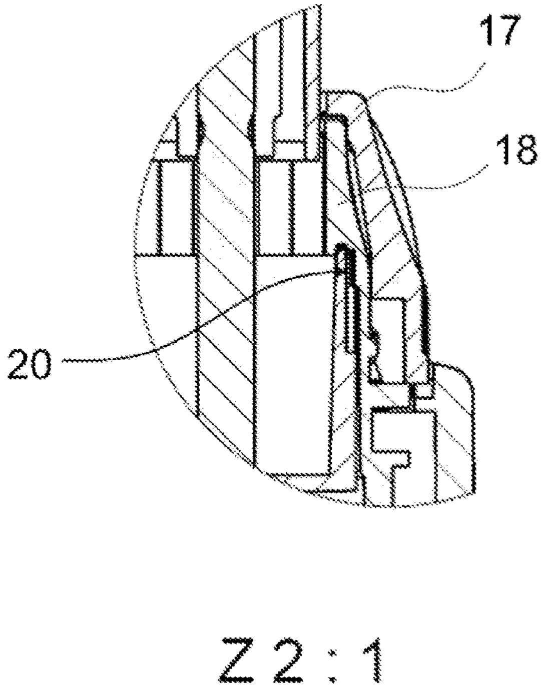
FIGS. 4A, 4B and 4C are schematic sectional detail views of the pipette according to FIG. 3, FIGS. 5A, 5B and 5C are schematic perspective detail views of the pipette according to FIG. 3
Figure 4B:
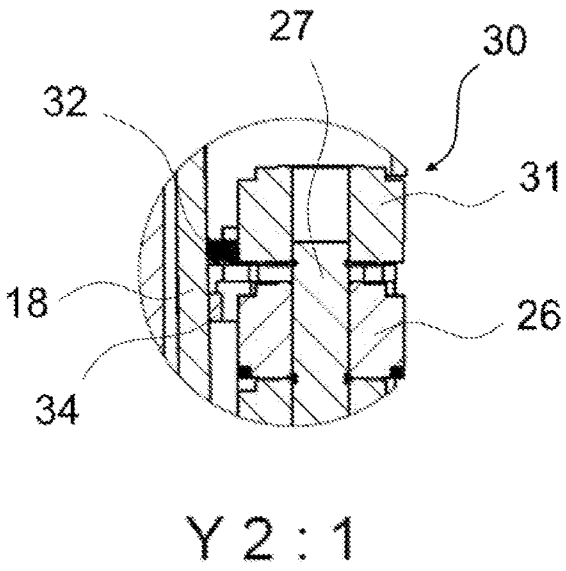
Figure 4C:
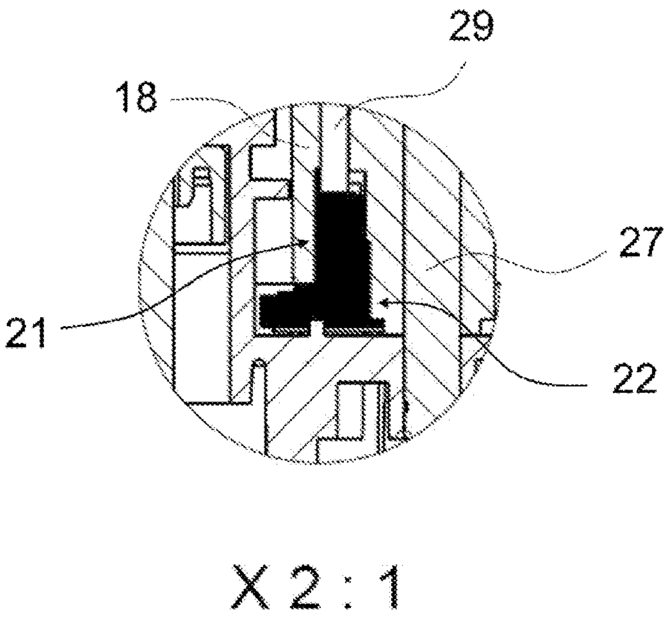
Figure 5A:
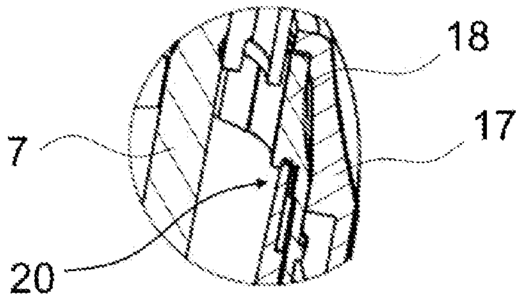
Figure 5B:
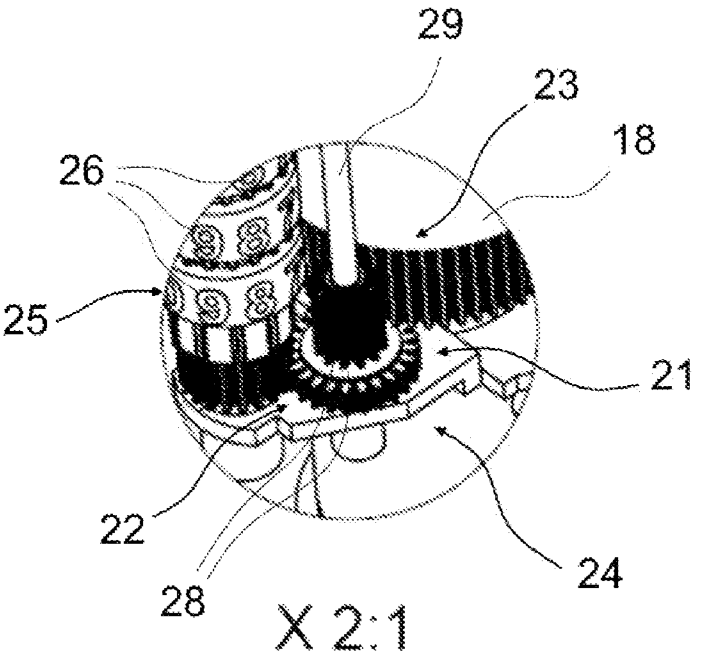

FIGS. 3 to 5 show the pipette 1 in a first operating mode, which may also be referred to as the working mode. The operating device 16 is in a first position associated with the first operating mode, also referred to as the working position. In this position, the operating device 16 is positively coupled to the volume setting mechanism 19 via a first mechanical coupling 20, for example a toothing. The detail views Z of FIGS. 4A and 5A show enlarged the area of the first coupling 20.

In the first mode of operation, the adjustment sleeve 18 of the control device 16 is further positively coupled to a display adjustment mechanism 22 via a second mechanical coupling 21. Looking at the detail views X of FIGS. 4C and 5B, the adjustment sleeve 18 has a first coupling element 23 in the form of gearing for forming the second coupling 21, which is in engagement with the display adjustment mechanism 22 for actuation thereof. The display setting mechanism 22 includes a first gear 24. The first gear 24 is a coupling device as mentioned at the beginning. The display setting mechanism 22 optionally includes suitable further elements such as one or more further gearing elements, gears and/or the like for adjusting the volume display indicator 25. The volume display indicator 25 has a counter mechanism with a plurality of counting wheels 26, which are rotatably mounted on a rotational axis 27 fixed to the housing. The counting wheels 26 have, for example, numerals and/or letters. The first gear 24 has two gears 28 which are mounted on a common further axis of rotation 29 and are connected to one another in a rotationally fixed manner.

Figure 5C:
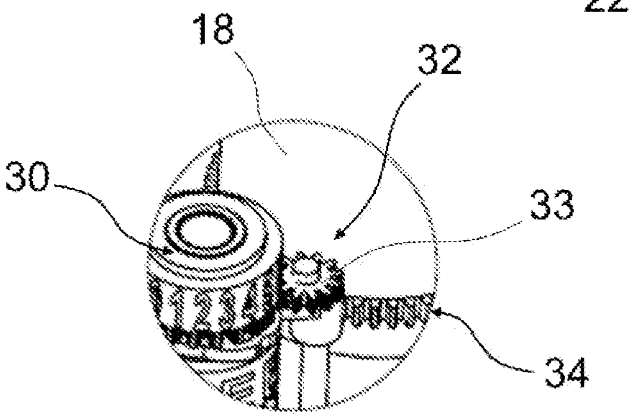

In this first embodiment example, the pipette 1 shown in FIG. 3 and the detail view Y of FIGS. 4B and 5C further comprises an adjustment display indicator 30 formed by a counting wheel 31 with numbers and/or letters, which is mounted on the rotation axis 27 like the counting wheels 26 of the volume display indicator 25. The adjustment display indicator 30 is arranged above the volume display indicator 25. The counting wheel 31 of the adjustment display indicator 30 is positively coupled to a second gear 32, which is formed by a further gear wheel 33. The second gear 32 can be regarded as parts of an adjustment mechanism for the adjustment indicator 30.

For actuation of the adjustment indicator 30, the adjustment sleeve 18 includes a second coupling element 34, but in the first mode of operation, the second coupling element is not engaged with the adjustment indicator 30, so that no further third coupling is formed, as shown in the detail views Y of FIGS. 4B and 5C.

In the first operating mode, the operating device 16 is thus coupled, on the one hand, to the volume setting mechanism 19 and, on the other hand, to the display setting mechanism 22. If the operating device 16 is actuated in the first operating mode, i.e., rotated, the upper stop 12 and the volume display indicator 25 are adjusted simultaneously by means of the two couplings 20 and 21. The adjustment display indicator 30 remains unchanged.

Figure 6:
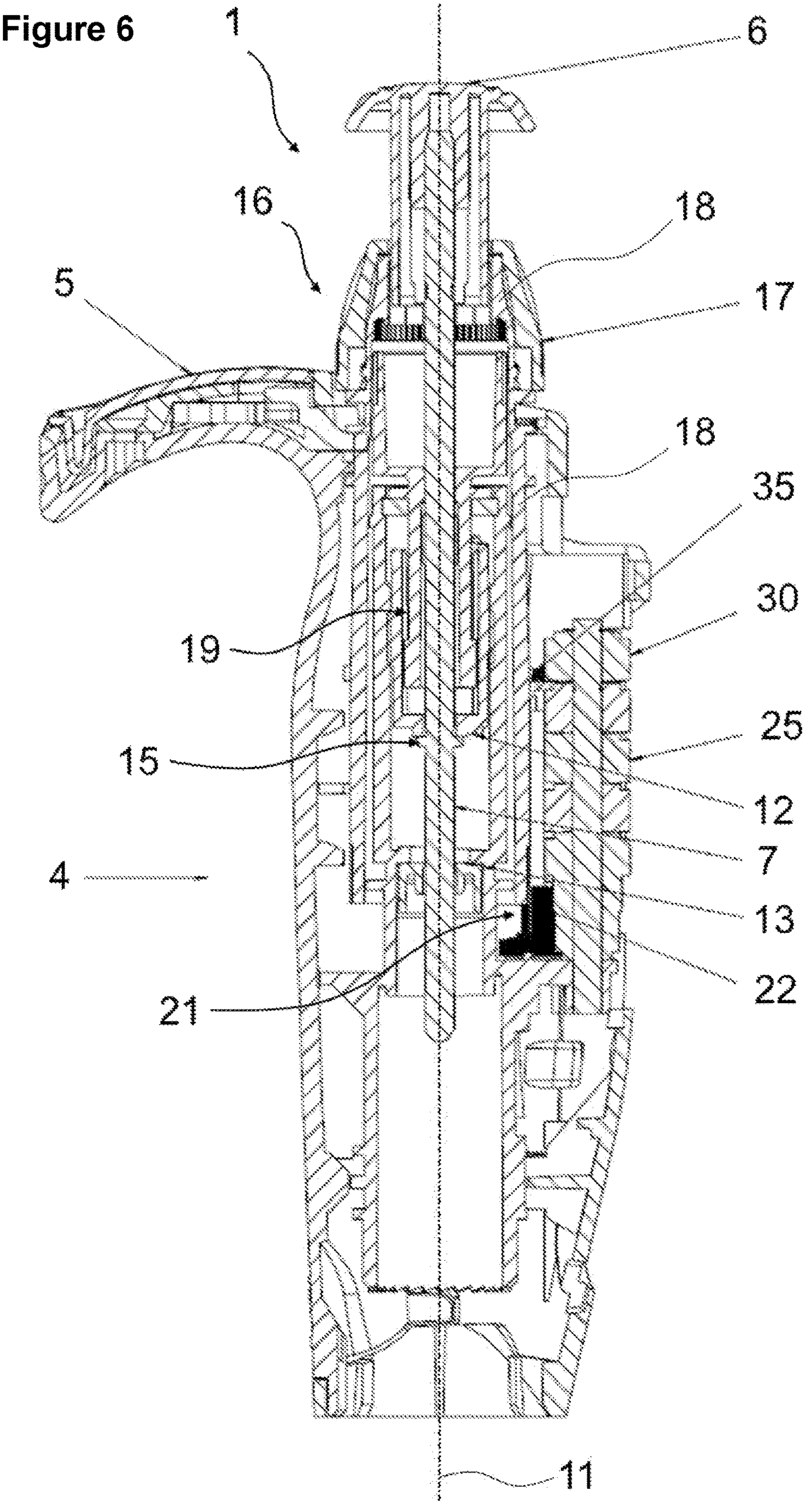
FIG. 6 is an enlarged sectional view of the pipette according to the first embodiment in a second operating mode.
Figure 7A:
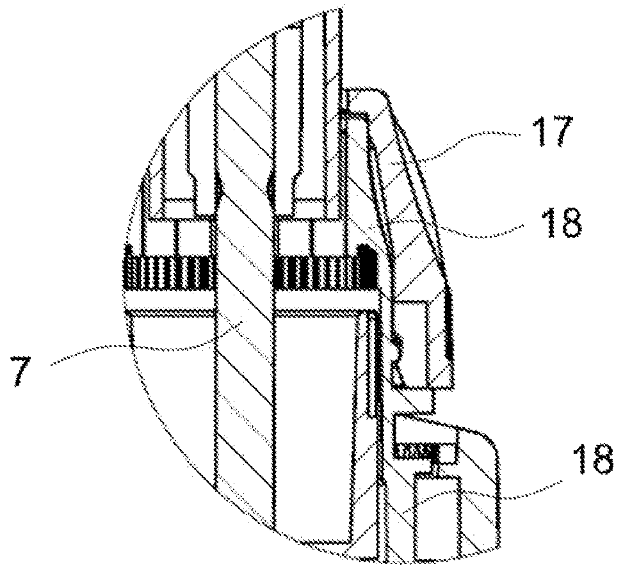
FIGS. 7A, 7B and 7C are schematic sectional detail views of the pipette according to FIG. 6, FIGS. 8A, 8B and 8C are schematic perspective detail views of the pipette according to FIG. 6.
Figure 7B:
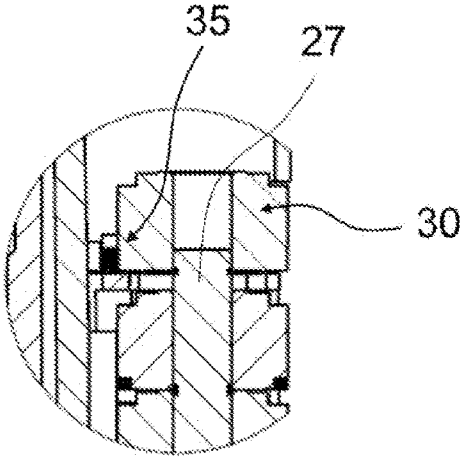
Figure 7C:
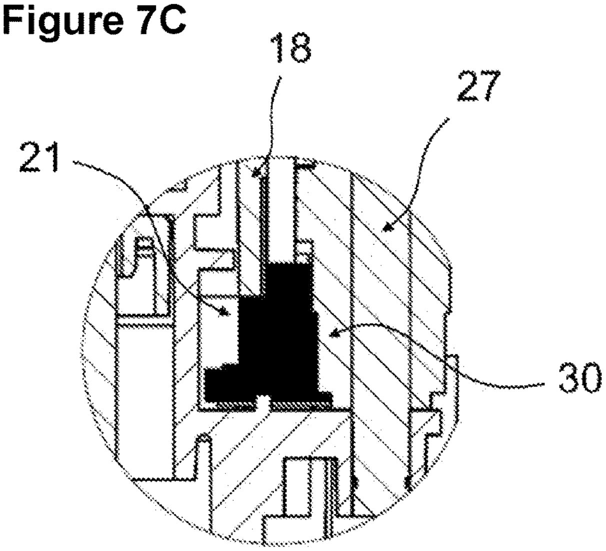
Figure 8A:
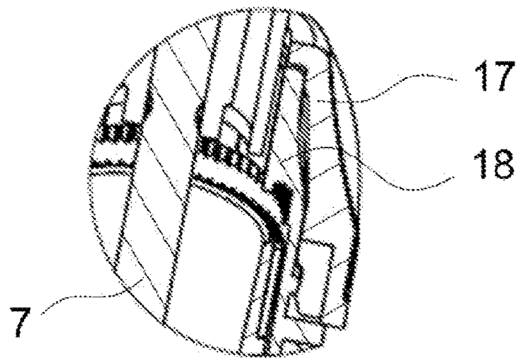
Figure 8B:
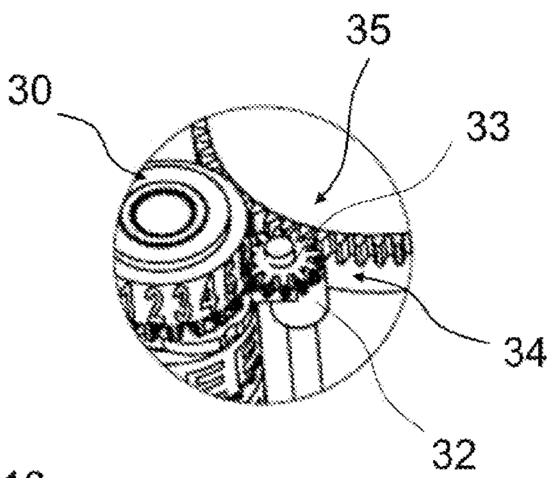

FIGS. 6 to 8 show the pipette 1 in a second operating mode of the first embodiment, which may also be referred to as the adjustment mode. The operating device 16 is in a second position associated with the second operating mode, also referred to as the adjustment position. In this position, the operating device 16 is axially displaced upwards with respect to the longitudinal axis 11, the first coupling 20 being disengaged. In other words, the operating device 16 is no longer in positive engagement with the volume adjustment mechanism 19. In this respect, it is apparent from the detail views Zj of FIGS. 7A and 8A that the toothed engagement is disengaged via the adjustment sleeve 18, an internal toothing of the adjustment sleeve 18 being visible. This can be seen when compared to the detail views Z of FIGS. 4A and 5A, which show the first mode of operation.

Figure 8C:
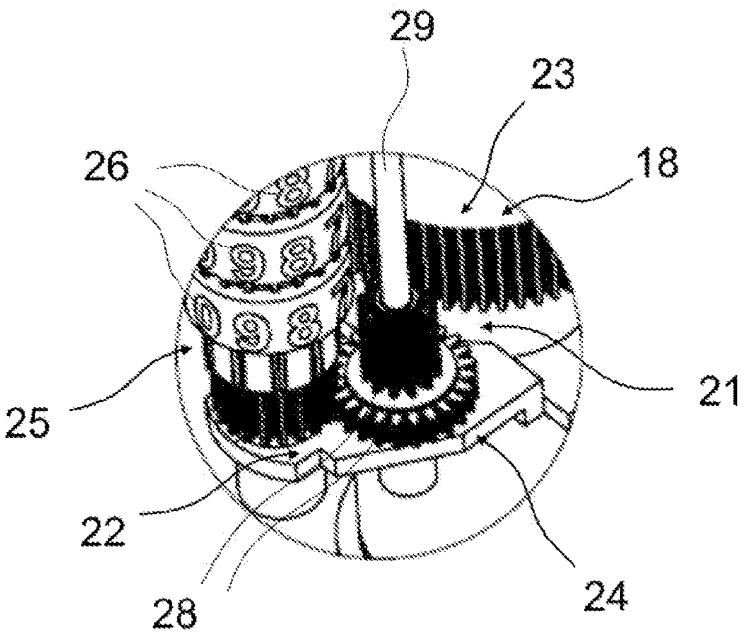

In the adjustment position, however, the operating device 16, that is, the adjustment sleeve 18 still remains in positive engagement with the display adjustment mechanism 22, that is, the second coupling 21 remains in place, as shown in the detail views Xj of FIGS. 7C and 8C. The first coupling element 23 is still in engagement with the first gear 24 for adjusting the volume display indicator 25.

In addition, to form the third coupling 35 in the second operating mode, the second coupling element 34 is brought into positive engagement with the second gear 32, that is, the further gear 33, by the axial displacement of the adjusting sleeve 18. In this regard, reference is made to the detail views Yj of FIGS. 7B and 8B.

Thus, the operating device 16 is mechanically coupled in the second operating mode in such a way that, when actuated, both the volume displays 25 and the adjustment display indicator 30 can be adjusted simultaneously. In the adjustment mode of the pipette 1, an adjustment, i.e., adjustment, of the volume display indicator 25 can thus be carried out, whereby the adjustment display indicator 30 can be used to track the adjustment made to the volume display indicator 25.

Of course, the pipette 1 can be transferred back to the first operating mode.

The described pipette 1 thus enables the advantages and functions mentioned at the beginning.

Optionally, the pipette 1 is provided with the operating device 16 being latched or otherwise locked in the respective positions corresponding to the operating modes, so that only the rotational movement is enabled for the adjustment sleeve 18.

In the described embodiment, the volume display indicator 25 and the adjustment display indicator 30 form an assembly, with the counter wheels 26 and 31 mounted on the common rotation axis 27. Optionally, the two indicators 25 and 30 are separate assemblies. They may be adjacent, but may also be spaced apart, for example on opposite sides with respect to the longitudinal axis 11.

In the described embodiment example, the volume display indicator 25 and the adjustment display indicator 30 are arranged inside the pipette housing 2. One or both of the indicators 25 and 30 can optionally also be arranged outside the pipette housing 2. Optionally, one or both of the display indicators 25 and 30 can be arranged in the finger bar 5 or in the operating device 16, such as the operating element 17.

In the described embodiment example, the two display indicators 25 and 30 can be read from outside the pipette 1 through two separate windows 36, as FIG. 1 shows. The displays can optionally be read through a common window.

Optionally, the operating element 17 and the adjustment sleeve 18 are formed in one piece, i.e., as one component.

Optionally, instead of the two gearboxes 24 and 32, a common gearbox is provided for the indicators 25 and 30 to operate them, as provided in the following embodiment.

FIGS. 9 to 14 relate to a pipette 1 according to a second embodiment of the invention. Essentially, the pipettes 1 of both embodiments are similar, in particular with regard to functionality, operating modes, advantages and functions.

Therefore, only details and differences of both embodiments will be highlighted in the following.

Figure 9:
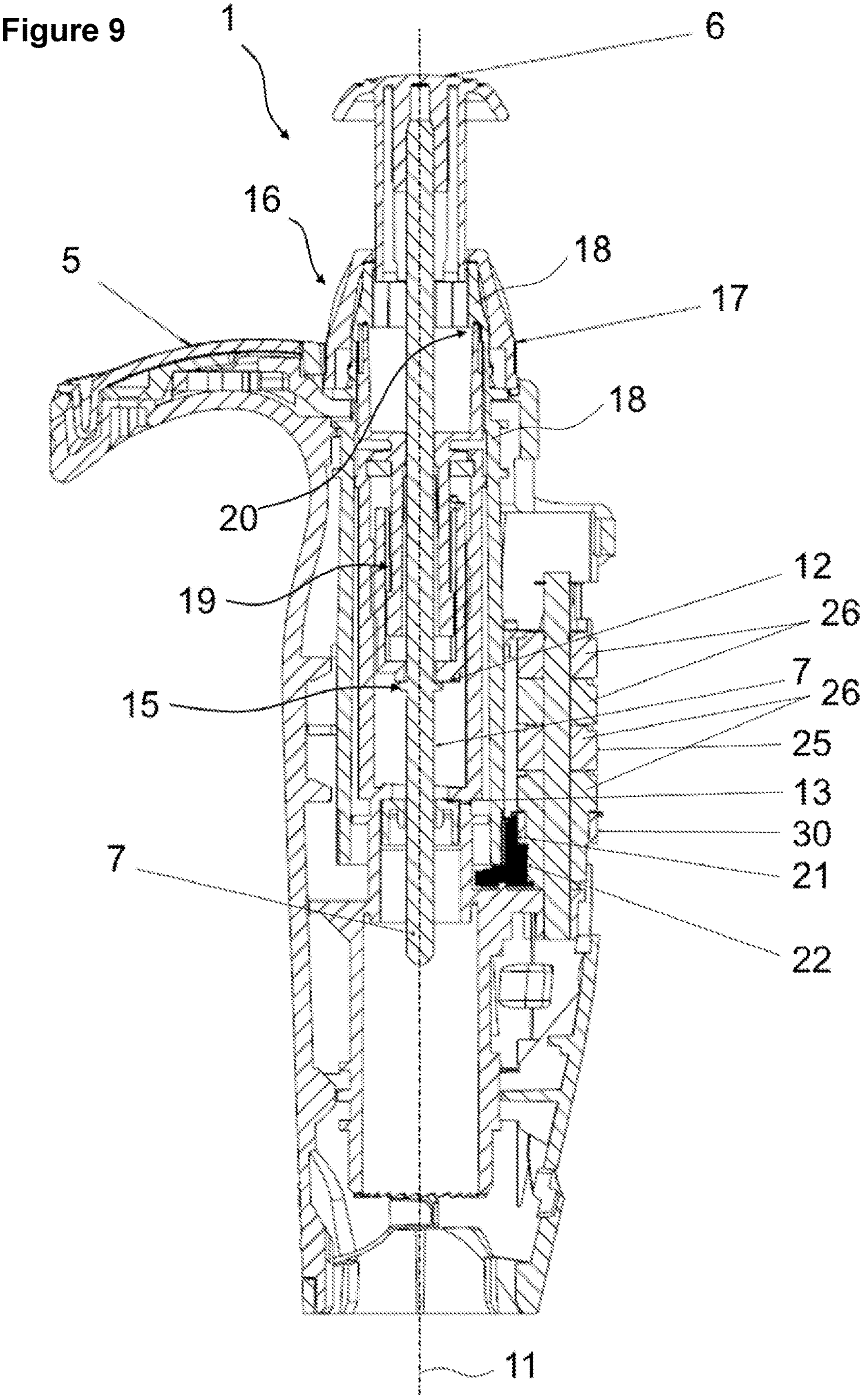
FIG. 9 is an enlarged sectional view of a pipette according to a second embodiment in a first operating mode.
Figure 10:
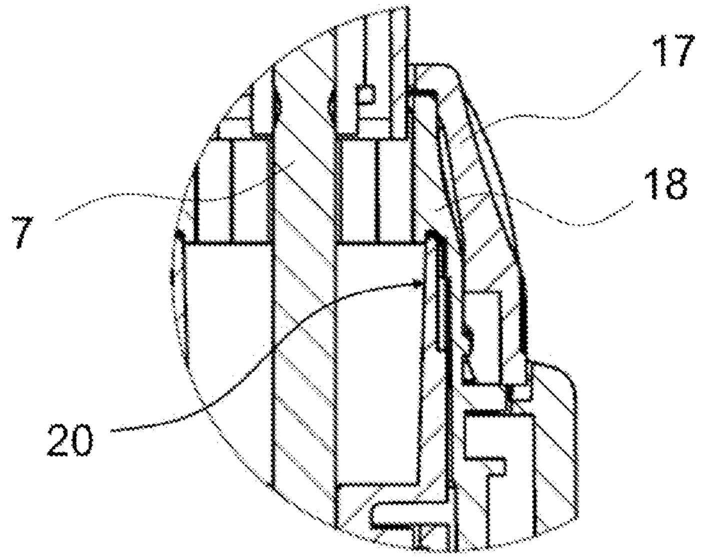
FIG. 10 is a schematic sectional detail view of the pipette according to FIG. 9.

FIG. 9 shows the pipette 1 in the first operating mode. The operating device 16 is mechanically coupled to the volume adjustment mechanism 19 via the first coupling 20 for adjusting the piston stroke, as shown in FIG. 10 concerning the detail view Z of FIG. 9.

Figure 11:
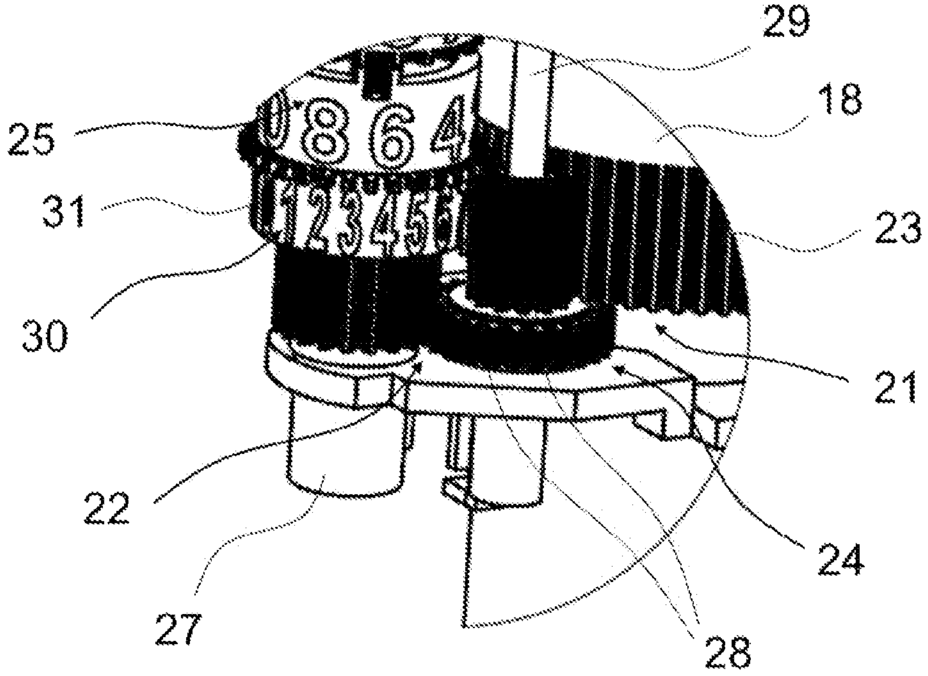
FIG. 11 is a schematic perspective detail view of the pipette according to FIG. 9, and corresponding perspective detail views

Looking in particular at FIG. 11 and the detail view X of FIG. 9, in the first operating mode of the pipette 1, the adjustment sleeve 18 is engaged with the display adjustment mechanism 22 via the first gear 24 so that the volume display indicator 25 is adjustable. The second coupling 21 is thus formed. In contrast to the first embodiment, the adjustment display indicator 30 is arranged below the volume display indicator 25. The adjustment of the adjustment display indicator 30, i.e., its counter wheel 31, would also take place via the first gear 24, i.e., the upper gear wheel 28, but this is not in engagement with the counter wheel 31, so that no third coupling is formed with the operating device 16.

Figure 12:
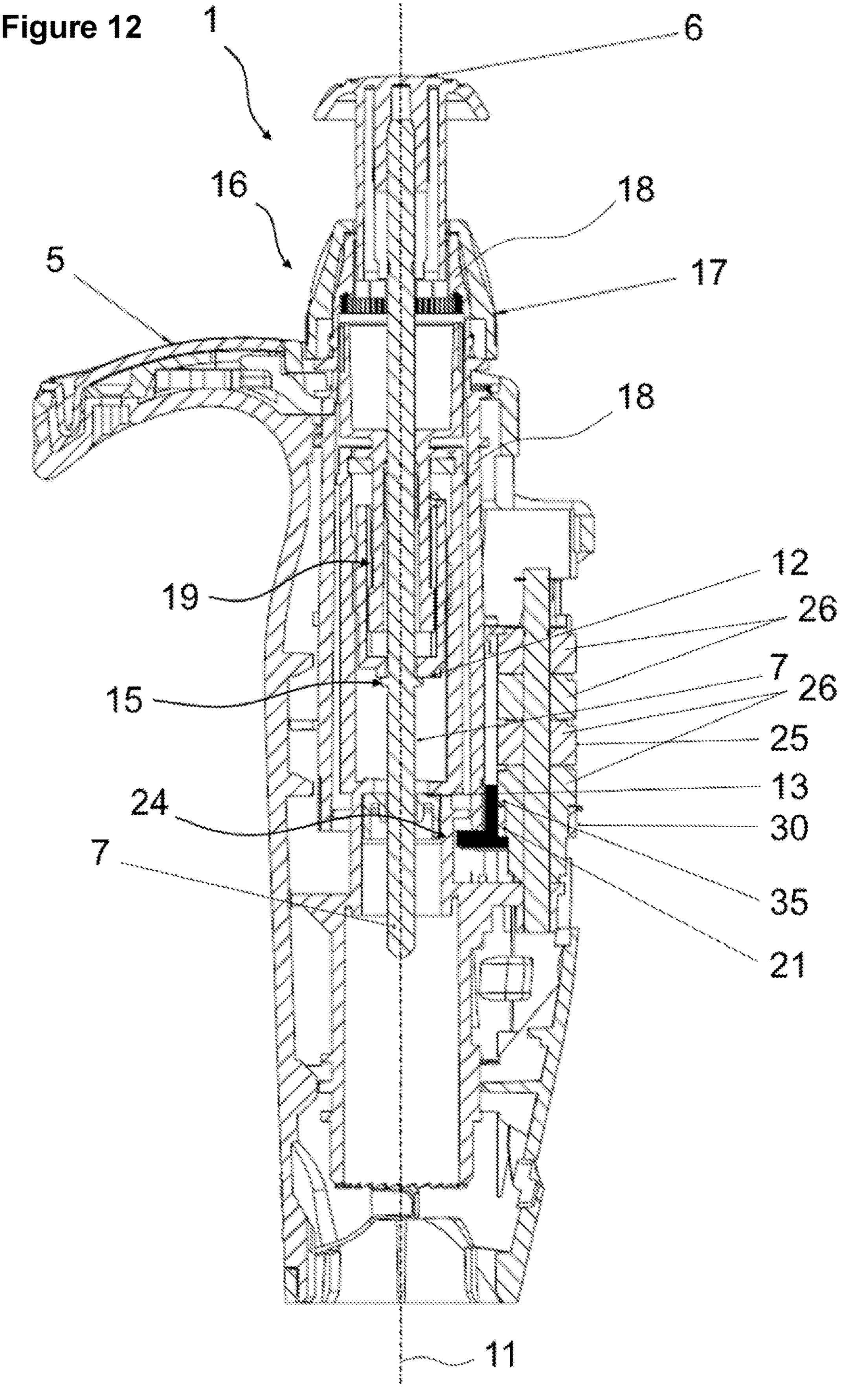
FIG. 12 is an enlarged sectional view of the pipette according to the second embodiment in a second operating mode.
Figure 13:
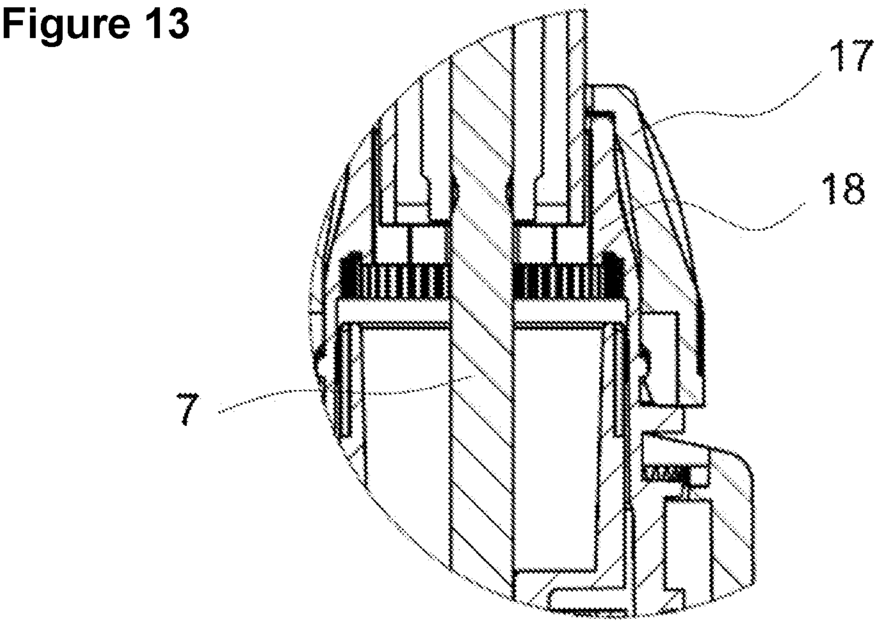
FIG. 13 is a schematic sectional detail view of the pipette according to FIG. 12.
Figure 14:
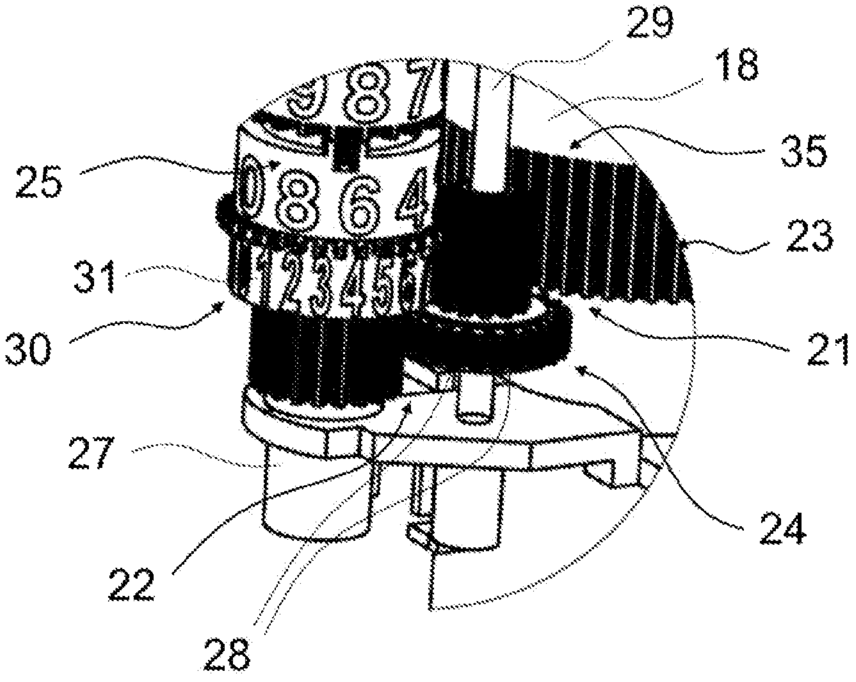
FIG. 14 is a schematic perspective detail view of the pipette according to FIG. 12.
Figure 15:
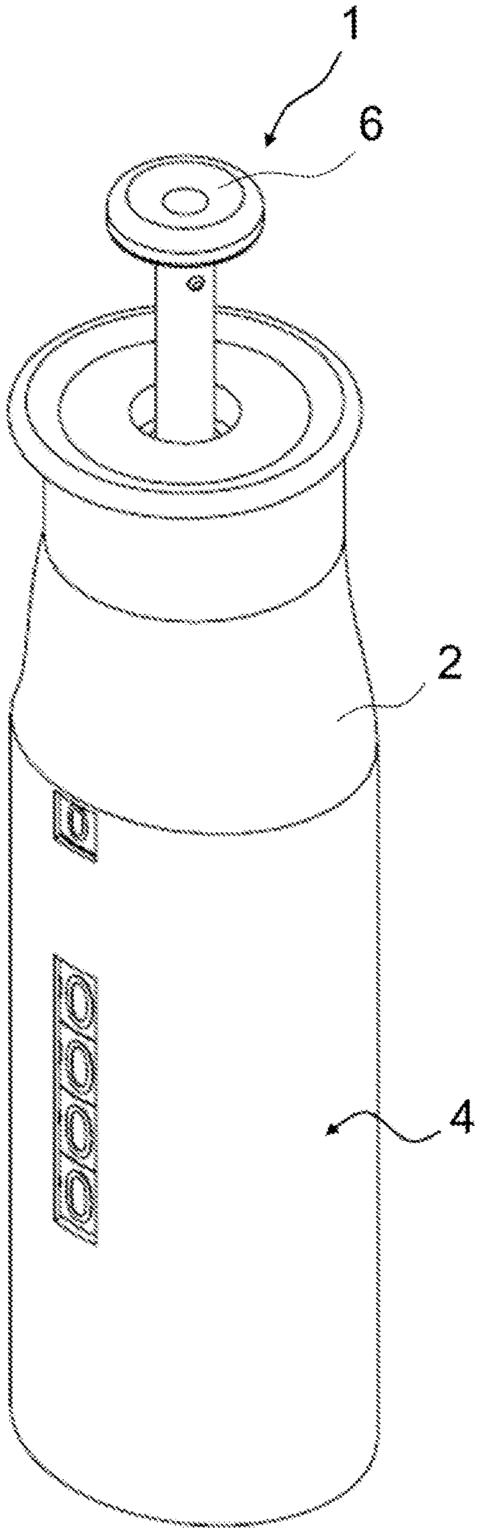
FIG. 15 is a perspective view of a pipette according to a third embodiment of the invention.

In the second operating mode of the pipette 1 according to FIGS. 12 to 14, the operating device 16 and thus the adjustment sleeve 18 is again shifted axially upwards with respect to the longitudinal axis 11, whereby the first coupling 20 is again disengaged, as shown in detail view Zj according to FIG. 13, while the operating device 16 can now actuate both the adjustment indicator 30 and the volume indicator 25 by means of the couplings 21 and 35 via the gear 24, as shown in detail view Xj according to FIG. 14. To form the third coupling 35, the two gears 28 of the first gear 24 are shifted axially upward with respect to the further axis of rotation 29.

The shifting of the gears 28 can be spring-assisted. As a result, the upper of the two gear wheels 28 is in mesh with the counter wheel 31, i.e., a toothing of the latter. The third coupling 35 is thus also effected via the first coupling element 23 of the adjusting sleeve 18.

It should be noted here that in the example, the adjustment sleeve 18 rests on the lower gear 28, which is wider in diameter. This allows the adjusting sleeve 18 to press down on the two gears 28, which are connected to each other in a rotationally fixed manner as an assembly, and hold them in the position corresponding to the first operating mode.

The two display indicators 25 and 30 thus share the first gear 24. In other words, it is a common gear for both displays or mechanisms for actuating them.

The pipette 1 according to the second embodiment example enables the advantages and functions mentioned at the beginning, whereby essentially the arrangement of the display indicators 25 and 30 as well as the couplings, in particular the third coupling 35, are changed in comparison to the first example. The further embodiments mentioned with respect to the first example apply analogously to the second embodiment example.

FIGS. 15 to 22 relate to a third embodiment example of a pipette 1. The pipette 1 according to the third embodiment example corresponds in essence to the pipettes of both preceding embodiment examples, with an additional third operating mode being provided. It should be noted that the previous explanations, reference signs and feature descriptions apply analogously to the third embodiment example, unless otherwise described below. Therefore, not all explanations according to the first two embodiment examples are repeated in the following.

The pipette 1 shown in simplified form in FIGS. 15 to 22 has a pipette housing 2, a handle portion 4, and a pipetting knob 6. Not shown are the pipette tip, pipetting volume components, and a finger clip 5.

The pipetting button 6 is firmly connected to a piston stroke rod 7. A piston, which is not shown, can be arranged at a lower end of the piston stroke rod 7 and can be displaced axially with respect to a longitudinal axis 11 of the pipette 1 against a spring force of a spring in a cylinder. The longitudinal axis 11 coincides with a central longitudinal axis of the piston stroke rod 7. The axial displaceability of the piston is in turn limited by an upper stop and a lower stop, so that a maximum piston stroke and thus a corresponding pipetting volume are defined. By actuating the pipetting button 6 downwards in the depiction of FIG. 15, pipetting is performed or liquid is aspirated when the button is released.

Analogous to above, the pipette 1 has an operating device 16, which in the third embodiment is formed in one piece and integrally has an operating element 17 and an adjustment sleeve 18. The operating device 16 is rotatable and axially displaceable with respect to the longitudinal axis 11. Analogously to above, the pipette 1 has a volume adjustment mechanism 19 for changing the piston stroke.

In contrast to the above embodiment examples, the volume indicators 25 and the adjustment indicator 30 are not arranged next to the piston stroke rod 7, but around it. This means that the counter wheels 26 and 31 are arranged in a ring or cylinder shape around the piston stroke rod 7 and are rotated with respect to the piston stroke rod 7 and the longitudinal axis 11, respectively. The mechanical couplings and the actuation of the indicators are solved differently compared to the previous examples.

Figure 16:
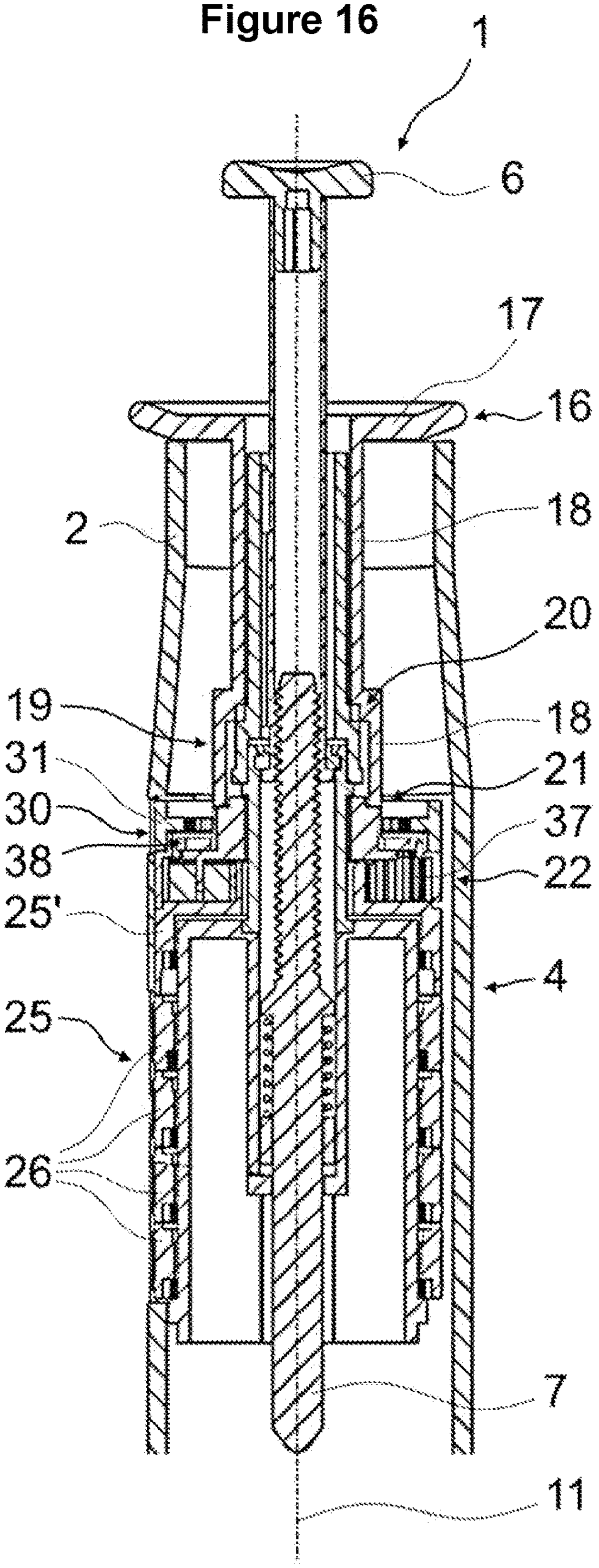
FIG. 16 is a sectional view of the pipette according to the third embodiment.
Figure 17:
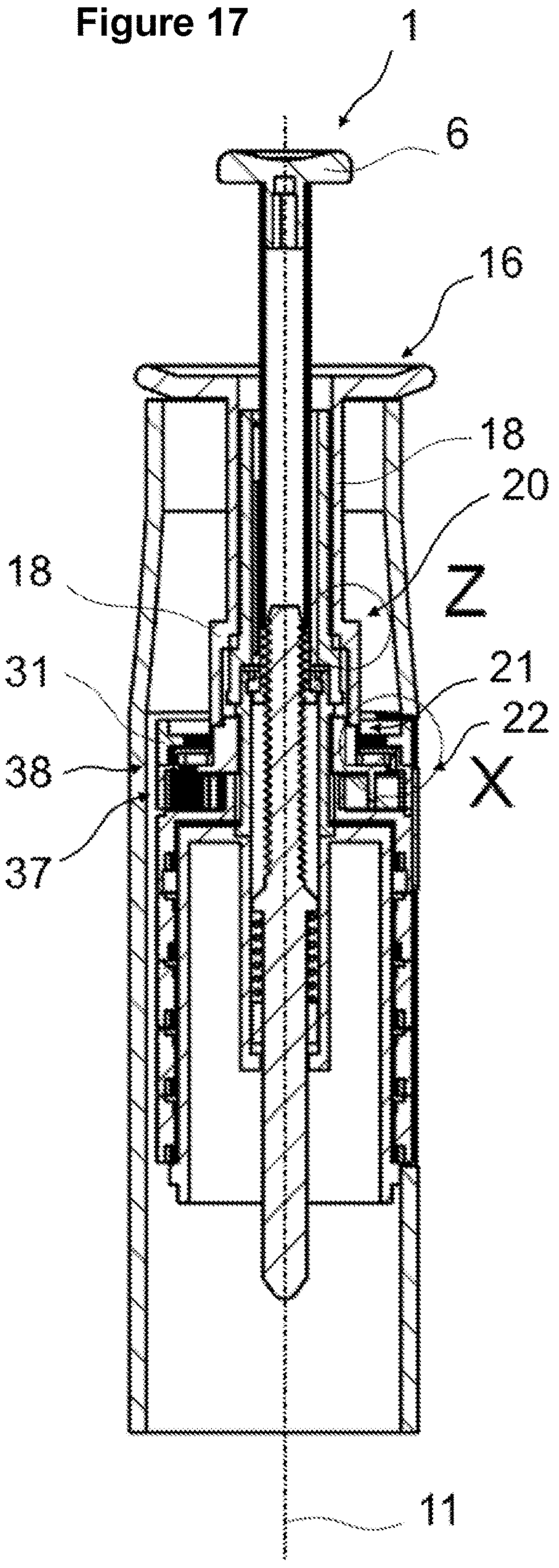
FIG. 17 is a sectional view of the pipette according to the third embodiment in a first operating mode.
Figure 18A:
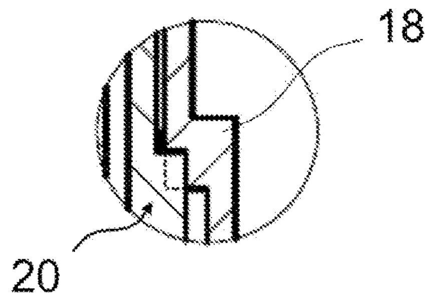
FIGS. 18A and 18B are detail views of the pipette according to the third embodiment in the first operating mode.
Figure 18B:
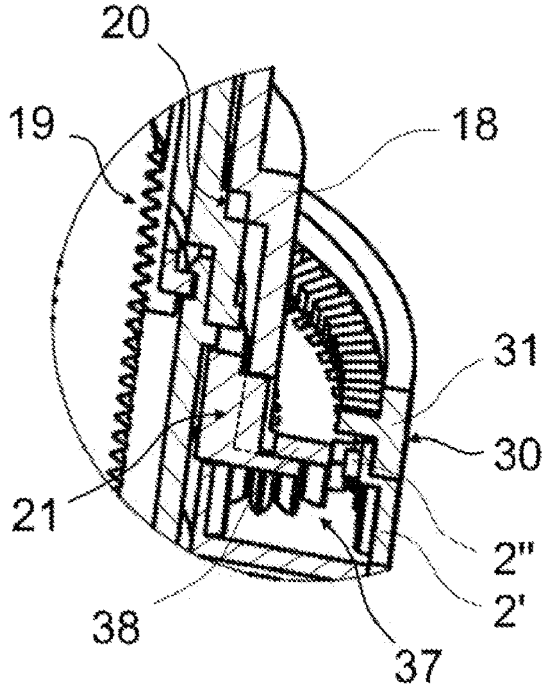

FIGS. 16 to 18 represent the first operating mode of the pipette 1. Here, the adjustment sleeve 18 is engaged with the volume adjustment mechanism 19 via a first coupling 20, in particular by means of a toothed engagement, as shown in the detail view Z in FIG. 18A. In addition, the adjustment sleeve 18 is coupled to a display adjustment mechanism 22 via a second coupling 21, as shown in detail views X and Z in FIGS. 18A and 18B.

In a preferred variant, the display adjustment mechanism 22 comprises, among other things, a planetary gear 37, designed as a step-up or reduction gear, via which the counter of the volume display indicator 25 is adjusted. For this purpose, the planetary gears are rotatably arranged on the coupling element 21, mesh, on the one hand, in a gear rim 2' on the pipette housing 2 and, on the other hand, drive a drive wheel 25', which is rotationally connected to the counting wheels 26 of the volume display indicator 25.

The adjustment of the adjustment indicator 30, i.e., its counter wheel 31, would be effected via a further coupling element 38 of the adjustment sleeve 18. However, in the first operating mode, this is not engaged with the adjustment indicator 30 or the counter wheel 31, so that no third coupling is formed with the operating device 16.

Optionally, and described in a further independent embodiment, the adjustment sleeve 18 is inserted into the pipette housing 2 in an axially lowermost adjustment position and is held in this position in a rotationally fixed manner by a form closure of the further coupling element 38 with the pipette housing 2. The detail view X according to FIG. 18B shows below the counter wheel 31 the pipette housing 2 with a toothing 2" projecting towards the longitudinal axis 11, which is connected to the further coupling element 38. The adjustment sleeve 18 and consequently the operating device 16 cannot be adjusted. In this embodiment and in the state shown in FIG. 18B, the pipette is in a locking mode.

Figure 19:
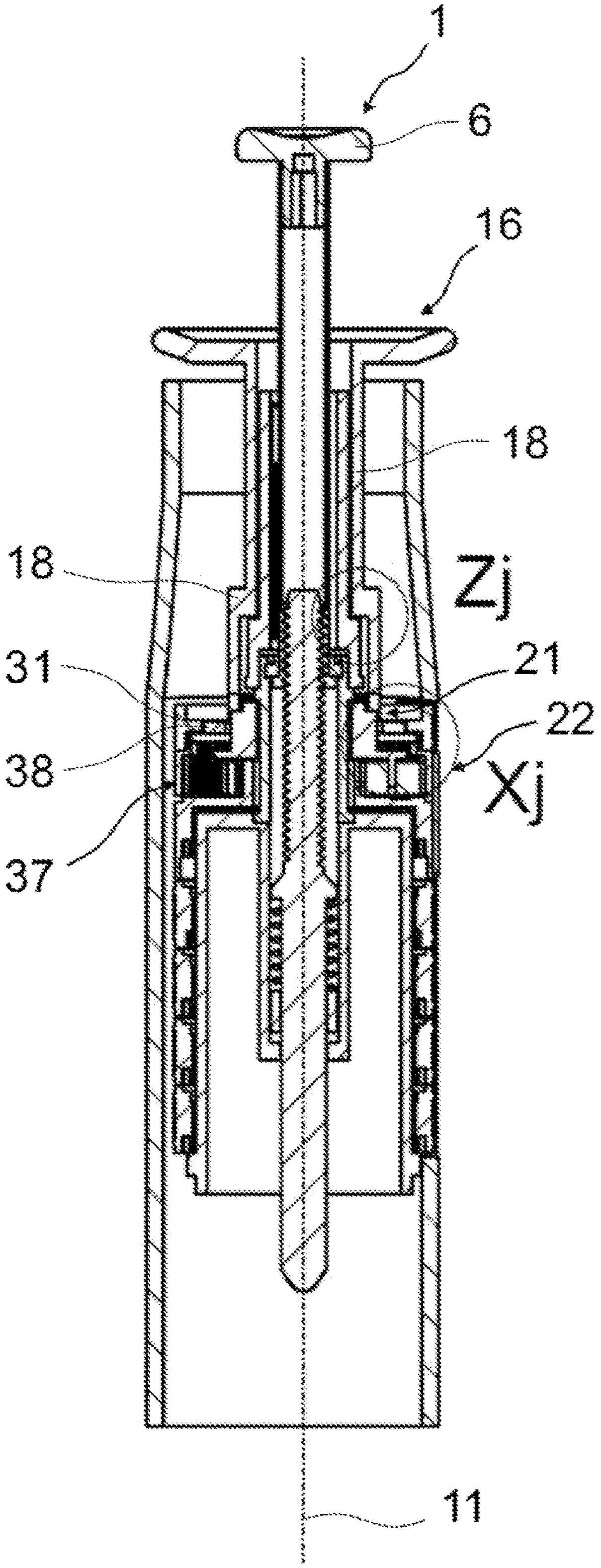
FIG. 19 is a sectional view of the pipette according to the third embodiment in a second operating mode.
Figure 20A:
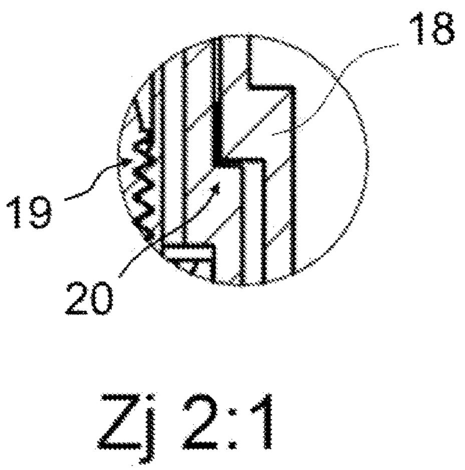
FIGS. 20A and 20B are detail views of the pipette according to the third embodiment in the second operating mode.
Figure 20B:
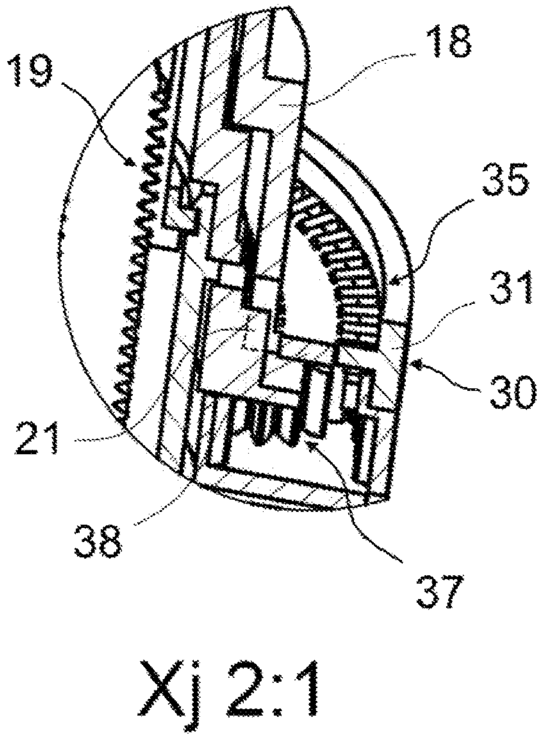
Figure 21:
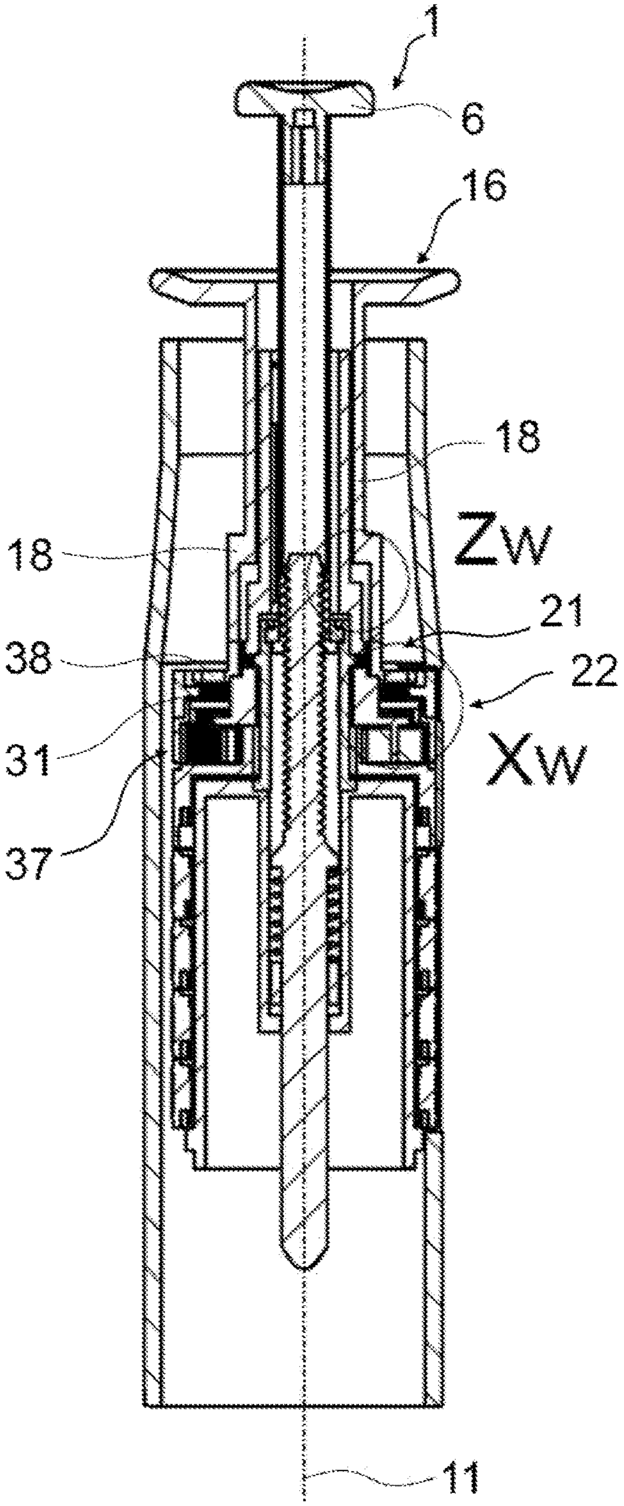
FIG. 21 is a sectional view of the pipette according to the third embodiment in a third operating mode.

In the second operating mode of the pipette 1 according to FIGS. 19 and 20A/B, the operating device 16, and thus the adjustment sleeve 18, is again displaced axially upwards with respect to the longitudinal axis 11. In the second operating mode, a first coupling 20 is no longer formed between the operating device 16 and the volume setting mechanism 19, as shown in FIG. 20A. In contrast, the operating device 16 can now operate the adjustment display indicator 30 as well as the volume display indicator 25 by means of the couplings 21 and 35 via the further coupling element 38. In the detail view Xj according to FIG. 20B, the coupling 21 and the connection of the further coupling element 38 with the counter wheel 31 are shown.

Figure 22A:
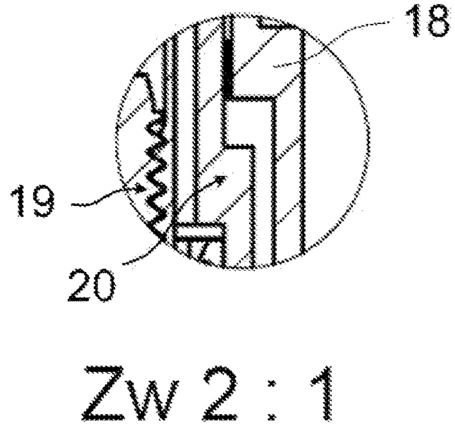
FIGS. 22A and 22B are detail views of the pipette according to the third embodiment in the third operating mode.
Figure 22B:
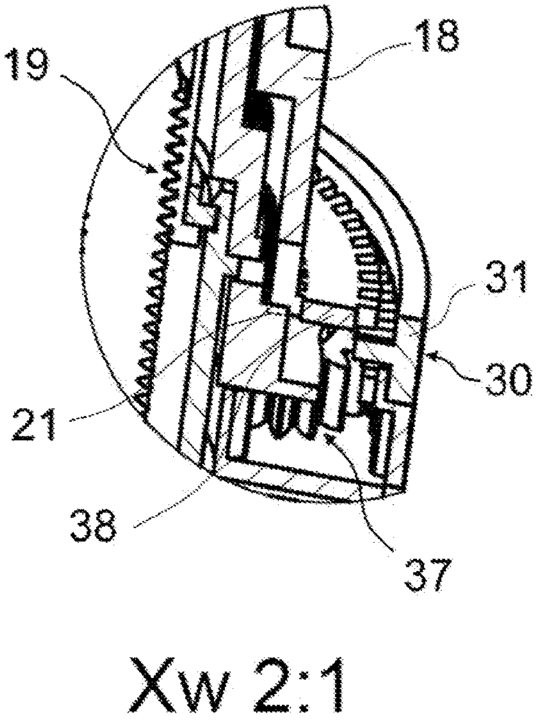

The pipette 1 can now be transferred to a third operating mode, also called factory adjustment mode, in addition to the pipettes already described. For this purpose, the operating device 16 is moved further, upwards in FIGS. 21, 22A and 22B, in the axial direction. In this mode, the adjustment sleeve 18 is still not coupled to the volume adjustment mechanism 19, as shown in FIGS. 22A and 22B. The first coupling 20 is still not formed. The adjustment sleeve 18 continues to be coupled to the display adjustment mechanism 22 via the second coupling 21. However, the third coupling 35 is again removed so that the adjustment sleeve 18 can no longer operate the adjustment indicator 30. FIG. 22B shows the further coupling element 38 above and out of engagement with the counter wheel 31.

In this third operating mode, it is consequently possible to adjust the volume display indicator 25 by means of the operating device 16 without also changing the adjustment display indicator 30 and the piston stroke.

In a variant not explained and shown in more detail, the adjustment sleeve is axially displaced upwards from the first operating mode to the second operating mode and axially displaced downwards to the third operating mode.

It is noted that the pipettes 1 according to the first two embodiments can also have the third operating mode according to the third embodiment analogously.

Common to all three embodiments of the pipettes 1 is that, starting from the actuated operating device 16, in the first operating mode, the volume setting mechanism 19 is coupled to the display setting mechanism 22, while in the second operating mode the volume setting mechanism 19 is decoupled from the display setting mechanism 22 and the display setting mechanism 22 is coupled to the adjustment display indicator 30. In the third embodiment, a third mode is also added, wherein only the display adjusting mechanism 22 is adjusted.

At this point, it is noted that the described mechanical couplings 20, 21, and 35 as well as the designs of the mechanisms for adjusting the upper stop 12, the volume display indicator 25, and the adjustment display indicator 30 can have other designs. Thus, fewer or more gears, gearing, gears and/or the like, as well as other types of these, are conceivable, as long as the principle functionality is achieved according to the described modes of operation.

Figure 23:
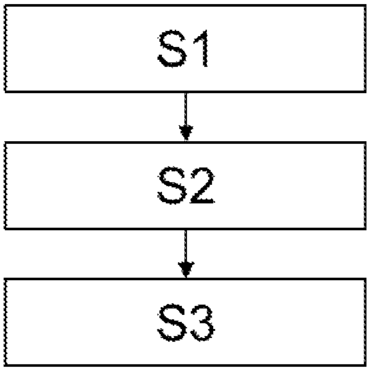
FIG. 23 is a schematic flow diagram of a method for operating a pipette.

FIG. 23 shows a flow chart of a method for operating a pipette according to an embodiment of the invention. Reference is made to one of the pipettes 1 according to the first two embodiments. The pipette 1 is initially in the first operating mode.

In a first step S1, the operating device 16 is actuated, whereby the operating element 17 is rotated. The volume adjustment mechanism 19 is thereby actuated, whereby the piston stroke of the pipette 1 is adjusted. At the same time, the operating device 16 actuates the display adjustment mechanism 22, so that the volume display indicator 25 is adjusted.

In a next step S2, the operating device 16 is axially displaced and transferred to a second position, the adjustment position, whereby the volume adjustment mechanism 19 is decoupled from the operating device 16. The pipette 1 is thus in the second operating mode.

In a next step S3, the operating device 16 is operated in the second operating mode. The display setting mechanism 22 is actuated and the adjustment display indicator 30 is actuated at the same time. Accordingly, the piston stroke does not change.

In an optional further step, the operating device 16 is moved axially to the first position, which corresponds to the first operating mode of the pipette 1. Subsequently, step S1 is carried out again.

Alternatively, the process is started in the second step S2. After the third step S3, the operating device 16 is moved axially to the first position, which corresponds to the first operating mode of the pipette 1. Subsequently, the step S1 is carried out.

The method can have further steps in accordance with the above embodiments of the pipettes 1 analogously. For example, in the case of the pipette 1 according to the third embodiment, a further step is provided in which the pipette 1 is transferred to the third operating mode, in which the volume display is adjusted by actuating the operating device, but not the adjustment display and the piston stroke.

The steps of the procedure can be carried out in a different order. Individual or several steps can also be performed repeatedly.

The invention is not limited to these by the description based on the embodiments. Rather, the invention encompasses any new feature as well as any combination of features, which in particular includes any combination of features, even if this feature or combination itself is not explicitly stated.

What is claimed is:

1. A pipette, comprising a cylinder, a piston which is arranged axially displaceably in the cylinder, wherein an axial movement of the piston is limited by an upper stop and a lower stop so that a piston stroke is defined, a volume display for displaying a pipetting volume associated with the piston stroke, a display adjustment mechanism for changing the volume display, an adjustment display for indicating an adjustment of the pipette via the volume display, and a volume adjustment mechanism for changing the piston stroke, wherein in a first mode of operation of the pipette, the volume adjustment mechanism is coupled to the display adjustment mechanism, and wherein in a second mode of operation of the pipette, the volume adjustment mechanism is decoupled from the display adjustment mechanism, and the display adjustment mechanism is coupled to the adjustment display.

2. The pipette of claim 1, comprising an operating device which is adjustable between the first operating mode and the second operating mode, wherein the operating device in the first operating mode is coupled to the volume adjustment mechanism for varying the piston stroke, and is coupled with the volume display, wherein the operating device in the second operating mode is decoupled from the volume adjustment mechanism, is coupled to the display adjustment mechanism, and is coupled with the adjustment display.

3. The pipette of claim 2, wherein the operating device comprises an adjustment sleeve that is positively coupled to the volume adjustment mechanism and the display adjustment mechanism, respectively, in the first mode of operation, and wherein the adjustment sleeve is positively coupled to the display adjustment mechanism and positively coupled to the adjustment display, respectively, in the second mode of operation.

4. The pipette of claim 3, wherein the adjustment sleeve comprises a first coupling element for actuating the display adjustment mechanism and a second coupling element for actuating the adjustment display.

5. The pipette of claim 3, wherein, in a third operating mode of the pipette, the volume adjustment mechanism is decoupled from the display adjustment mechanism, and the display adjustment mechanism is decoupled from the adjustment display, and wherein the adjustment sleeve for adjustment between the first, second and third operating modes is axially displaceably mounted in a housing of the pipette.

6. The pipette of claim 2, wherein the display adjustment mechanism and/or the adjustment display comprise a coupling device, wherein the coupling device comprises at least one of a gear wheel which is actuated by the operating device for actuating the display setting mechanism and/or the adjustment indicator.

7. The pipette of claim 6, wherein the coupling device of the display adjustment mechanism and/or the adjustment display comprises one or more gears effecting an overdrive or underdrive by the operating device on the display setting mechanism and/or the adjustment indicator.

8. The pipette of claim 1, wherein the volume display and the adjustment display each comprise a counter with one or more rotatably mounted counting wheels, wherein the counting wheels are arranged on a common axis of rotation.

9. The pipette of claim 1, wherein the volume display and/or the adjustment display are arranged offset from or coaxially around a piston stroke rod.

10. The pipette of claim 9, wherein the display adjustment mechanism comprises a gear.

11. The pipette of claim 1, wherein the display adjustment mechanism and the adjustment display are connected via a common transmission means.

12. The pipette of claim 1, wherein, in a third operating mode of the pipette, the volume adjustment mechanism is decoupled from the display adjustment mechanism, and the display adjustment mechanism is decoupled from the adjustment display.

13. The pipette of claim 1, further comprising an operating device which is:

positively coupled to the volume adjustment mechanism and the display adjustment mechanism, respectively, in the first mode of operation, and positively coupled to the display adjustment mechanism and the adjustment display, respectively, in the second mode of operation, wherein, in the second mode of operation, the adjustment display is coupled to the display adjustment mechanism such that actuation of the display setting mechanism simultaneously causes actuation of the adjustment display.

14. The pipette of claim 13, wherein the display adjustment mechanism and/or the adjustment display comprise a coupling device, wherein the coupling device comprises at least one of a gear wheel, which is actuated by the operating device for actuating the display setting mechanism and/or the adjustment indicator.

15. The pipette of claim 13, wherein the volume display and/or the adjustment display are arranged offset from or coaxially around a piston stroke rod.

16. The pipette of claim 15, wherein the display adjustment mechanism comprises a gear.

17. The pipette of claim 13, wherein, in a third operating mode of the pipette, the volume adjustment mechanism is decoupled from the display adjustment mechanism, and the display adjustment mechanism is decoupled from the adjustment display.

18. The pipette of claim 17, wherein the adjustment sleeve for adjustment between the first, second and third operating modes is axially displaceably mounted in a housing of the pipette.

19. A method of operating a pipette, the pipette comprising a cylinder, a piston which is arranged axially displaceably in the cylinder, wherein an axial movement of the piston is limited by an upper stop and a lower stop so that a piston stroke is defined, a volume display for displaying a pipetting volume associated with the piston stroke, a display adjustment mechanism for changing the volume display, an adjustment display for indicating an adjustment of the pipette via the volume display, and a volume adjustment mechanism for changing the piston stroke, the method comprising the following steps:

in a first operation mode of the pipette, operating the volume adjustment mechanism of the pipette and the display adjustment mechanism of the pipette, and thereby setting a piston stroke of the pipette, and actuating the volume display of the pipette, and in a second operation mode of the pipette, operating the display adjustment mechanism of the pipette, changing the volume display of the pipette and the adjustment display of the pipette, and maintaining the piston stroke of the pipette set.

* * * * *